United States Patent [19]
Chien

[11] Patent Number: 5,876,108
[45] Date of Patent: *Mar. 2, 1999

[54] ILLUMINATED ROTATING OBJECT

[76] Inventor: Tseng Lu Chien, 8P, No. 29, Alley 73 Lin-Shen Street, Shi-Chi Town, Hseng, Taipei, Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 510,701

[22] Filed: Aug. 3, 1995

[51] Int. Cl.$^6$ ........................................... B60Q 1/00
[52] U.S. Cl. ................. 362/35; 362/84; 362/464; 362/500; 362/103; 362/276
[58] Field of Search ................ 365/84, 103, 800, 365/276, 802, 806, 35, 190, 191, 184, 249, 251, 252, 250; 446/242, 219, 485, 47; 362/464, 500

[56] References Cited

U.S. PATENT DOCUMENTS

| | | | |
|---|---|---|---|
| 2,572,760 | 10/1951 | Rikelman | 36/1 |
| 3,153,745 | 10/1964 | Gurian et al. | 315/206 |
| 3,635,832 | 1/1972 | Toncy | 362/84 X |
| 3,740,542 | 6/1973 | Brody | 362/293 |
| 3,786,246 | 1/1974 | Johnson et al. | 446/47 |
| 3,789,208 | 1/1974 | Lewis | 362/78 X |
| 3,946,505 | 3/1976 | Dana, III | 36/2.5 |
| 4,132,031 | 1/1979 | Psyras | 446/47 |
| 4,158,922 | 6/1979 | Dana, III | 36/137 |
| 4,176,390 | 11/1979 | Galbert | 362/78 |
| 4,383,244 | 5/1983 | Knauft | 362/78 X |
| 4,494,326 | 1/1985 | Kanamori | 40/593 |
| 4,748,366 | 5/1988 | Taylor | 446/485 |
| 4,778,428 | 10/1988 | Wield | 446/47 |
| 4,847,735 | 7/1989 | Kawasaki | 362/84 X |
| 4,848,009 | 7/1989 | Rodgers | 36/137 |
| 4,864,473 | 9/1989 | Tokarz et al. | 362/84 |
| 4,895,110 | 1/1990 | LoCascio | 119/109 |
| 4,991,066 | 2/1991 | McCowan | 312/61 |
| 5,016,144 | 5/1991 | DiMaggio | 362/35 |
| 5,067,063 | 11/1991 | Granneman et al. | 362/156 |
| 5,245,516 | 9/1993 | de Haas et al. | 362/108 |
| 5,245,517 | 9/1993 | Fenton | 362/84 X |
| 5,278,732 | 1/1994 | Frankum | 312/78 X |
| 5,317,488 | 5/1994 | Penrod | 362/84 |
| 5,327,587 | 7/1994 | Hurwitz | 2/422 |
| 5,343,190 | 8/1994 | Rodgers | 340/573 |
| 5,392,200 | 2/1995 | Milde | 362/78 |
| 5,406,724 | 4/1995 | Lin | 36/137 |
| 5,426,792 | 6/1995 | Murasko | 362/105 |
| 5,446,629 | 8/1995 | Steiger et al. | 362/154 |
| 5,465,197 | 11/1995 | Chien | 362/103 |
| 5,513,080 | 4/1996 | Magle et al. | 362/253 |

FOREIGN PATENT DOCUMENTS

| | | |
|---|---|---|
| 0 121 026 | 10/1984 | European Pat. Off. . |
| 0 166 534 | 1/1986 | European Pat. Off. . |
| 2 227 714 | 11/1974 | France . |

*Primary Examiner*—Thomas M. Sember
*Attorney, Agent, or Firm*—Bacon & Thomas, PLLC

[57] ABSTRACT

A rotating object such as a wheel, wheel cover, or hubcap includes a lighting arrangement in the form of a super-thin lighting element such as an electro-luminescent or photo-luminescent strip or panel. In the case of an electro-luminescent strip or panel, the power supply is positioned on the rotating object so as not to interfere with rotation of the object, and may include a specially designed spring-based motion sensitive switch which can be deactivated by inserting a straw-like member between the poles of the switch.

14 Claims, 3 Drawing Sheets

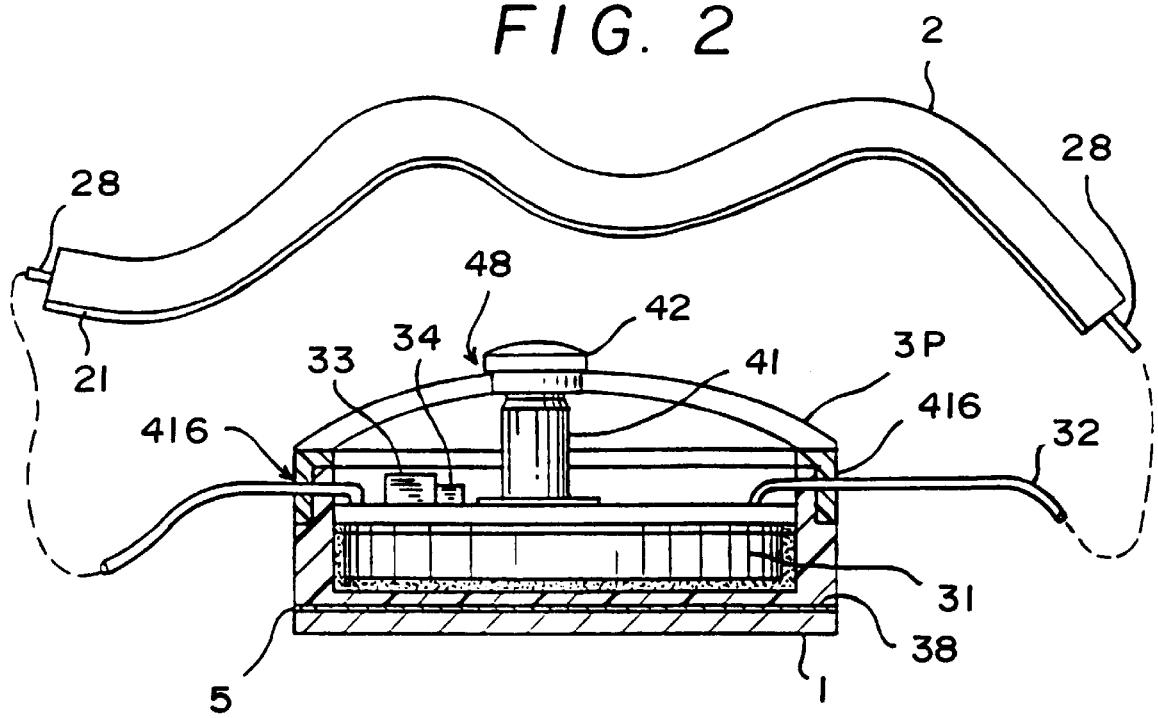
FIG. 2
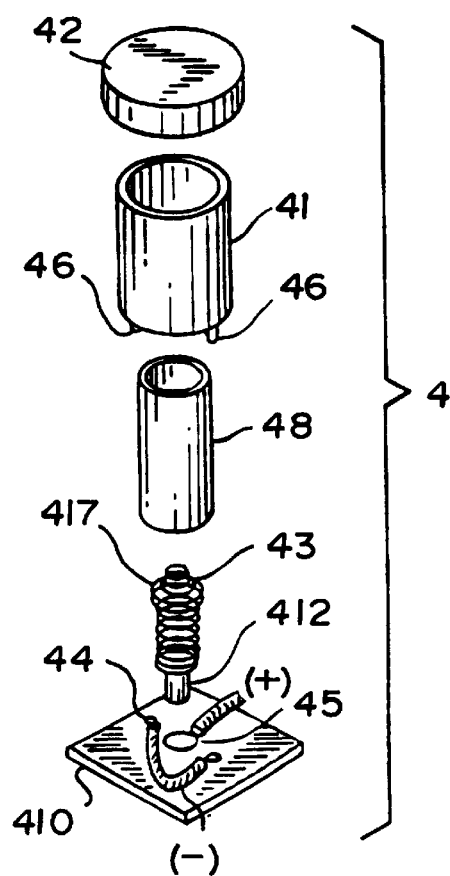
FIG. 3
FIG. 4

ILLUMINATED ROTATING OBJECT

BACKGROUND OF THE INVENTION

1. Field of the Invention

This invention relates to a rotating object such as a wheel, wheel cover, or hub cap.

2. Discussion of Related Art

This invention incorporates portions of the specification of U.S. patent application Ser. No. 08/444,064 filed May 18, 1995, now U.S. Pat. No. 5,720,651, which discloses various illuminated flying objects. During development of the invention described in the application, it became apparent that the many of the principles involved in the illumination of the types of flying objects described therein, and in particular the flying disc embodiment, could also be applied to rotating objects such as wheels and wheel covers.

It is known to add reflectors to the wheels of bicycles, motorcycles, and other vehicles for the purpose of making the vehicles more visible to motorists. The movement of the wheels causes the reflectors to rotate, thereby increasing the likelihood that the reflectors will be noticed, in contrast to more stationary reflectors or lights positioned elsewhere on the vehicle. However, such reflectors have the disadvantage that they are only visible over a narrow range of incident light. If the reflectors are not in the path of a headlight or other light source, and if the observer is not in the path of the reflected light, then the reflector will not be noticed.

One solution to this problem would be to replace the reflectors by conventional lighting arrangements, such as incandescent lights. However, incandescent lighting arrangements is impractical for use on most type of wheels or other rotating objects because of the size of incandescent light bulbs (minimum 8 mm diameter and 10 mm length), which on a wheel could interfere with rotation of the wheel, because of the fragility and high power requirements of incandescent lights, and because of high power requirements and the necessity of providing some type of commutating arrangement if the power supply cannot be placed on the wheel.

While LEDs are smaller and less fragile than incandescent lights, size both LEDs (minimum 3 mm diameter and 10 mm length, with a surface mounting height of 15 mm) is still a problem, as are the narrow viewing angle (at most 45°), lack of brightness (red, green, and yellow), and limited color choices of LEDs (red LEDs are brighter, but can confuse traffic and are prohibited in many jurisdictions. Also, LED-based lighting arrangements lack flexibility, may require a supporting circuit board which adds to the cost of the arrangement, and cannot be decorated by adding silk-screened designs or used in area lighting. Furthermore, even though LEDs are not easily broken, safety problems are not eliminated by using LEDs since the hardness of the LEDs can itself present a hazard to the user in case of impact, and the soldering points necessary to connect the LEDs to a supporting circuit board or wiring are relatively fragile and likely to fail even if the LED itself is not broken, unless protected by an expensive epoxy connection at each soldering point. Finally, although LEDs can be controlled by solid state trigger circuitry using motion sensors, the conventional motion sensor based switching systems used in such lighting arrangements are less than optimal in both size and complexity.

Paradoxically, even though LEDs have the problem of insufficient brightness, they also have the problem that the temperature of the available colors is such that the LEDs are visible under fairly bright background lighting conditions. It is actually preferable that a lighting arrangement for a wheel object not be visible at light levels above 10,000 lux, to prevent drivers in lighted urban areas from being confused by all of the rotating lighted objects. Furthermore, the color choice should be sufficient to prevent confusion with emergency signs, brake lights, and so forth. As a result, the color temperatures available for LEDs are generally unsuitable for the uses contemplated by the present invention. Instead, neon color-temperatures, and in particular green, blue, pink, amber, and white are best suited for the purpose of illuminated wheel, and will meet safety requirements even of jurisdictions in which red is prohibited except for emergency warnings.

In view of these problems, the Inventor has discovered that the most suitable lighting elements for use on rotating objects such as bicycle wheels, as well as other types of wheels, wheel covers, hub caps, and the like, are electro-luminescent (EL) or photo-luminescent (PL) strips, hereinafter referred to as "super-thin" lighting elements, which have none of the disadvantages of incandescent and LED based lighting arrangements. The size, flexibility, and low power consumption of these types of "super-thin" (preferably less than 3 mm thickness) makes them ideal for the applications described below. Not only can super-thin lighting arrangements based on EL or PL technology be used for illuminating rotating objects such as wheels, but such lighting arrangements can be made to exhibit a variety of special effects and come in a variety of bright colors.

While EL and PL strips or panels have been known for many years, however, and despite the advantages of such lighting elements in comparison with conventional incandescent and LED-based lighting arrangements, the use of these lighting elements is far from obvious. The Inventor has been refining uses for super-thin lighting elements for some time, and has found that each application takes special techniques which would not have been apparent to the ordinary artisan, such as the use of a specially designed spring-based motion sensitive switch for achieving motion based special effects, and as a result no printed publication or patent known to the Inventor even remotely suggests the use of super-thin lighting elements in a rotating object of the type with which the present invention is concerned.

SUMMARY OF THE INVENTION

It is accordingly an objective to provide a rotating object such as a wheel, wheel cover, hub cap, or the like having a lighting arrangement of the type which can safely be used on a variety of vehicles, including bicycles and automobiles, and also on toys, fans, and other rotating objects.

It is a further objective of the invention to provide a rotating object having a lighting arrangement which is flexible, multi-colored, has a wide viewing angle, uses little power, and yet is simple to construct and apply to the object.

It is a still further objective of the invention to provide a rotating object or device which is thin enough to be attached to the exterior of the object without affecting the aerodynamic characteristics of the object, and which is soft enough that it will not cause injuries upon impact between the object and a person, is durable and unbreakable, has a low power consumption of from 0.5 to 100 ma (0.09 ma/cm$^2$), is capable of using any mechanical or electrical switch, is capable of providing a variety of different light performances, is available in a variety of colors with relatively high brightness, can be printed with a variety of different designs, logos, and so forth, is bendable and can be easily attached to a variety of soft materials to provide area wide lighting at any desired location.

Briefly, these objectives of the invention are achieved by attaching, to a rotating object such as a wheel, a lighting arrangement in the form of a super-thin lighting element such as an electro-luminescent or photo-luminescent strip or panel. In the case of an electro-luminescent strip or panel, the power supply is positioned so as to enhance or at least not interfere with rotation of the object or device, and may include a specially designed spring-based motion sensitive switch which can be deactivated by inserting a straw-like member between the poles of the switch. In an especially preferred embodiment of the invention, the deactivating member of the motion sensitive switch is attached to a rubber plug which provides a handle for the member and also serves to seal the opening in the switch housing through which the member is inserted.

BRIEF DESCRIPTION OF THE DRAWINGS

FIG. 2 is a cross-sectional view of a switch and circuit board design in a housing with a two wire outlet to the super-thin light means for use in the preferred embodiment illustrated in FIG. 1.

FIG. 3 is a second cross-sectional view of the switch illustrated in FIG. 2.

FIG. 4 is an exploded perspective view of the switch shown in FIG. 2.

DETAILED DESCRIPTION OF THE PREFERRED EMBODIMENTS

Figure 1:
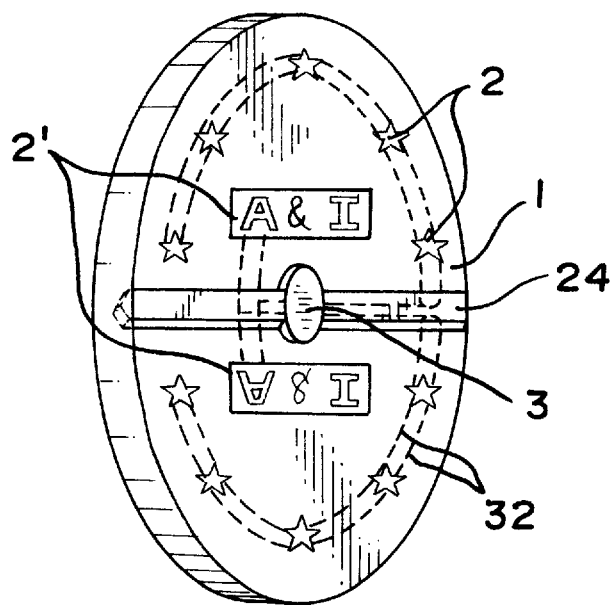
FIG. 1 is a perspective view of an illuminated wheel constructed in accordance with the principles of a preferred embodiment of the invention.
Figure 7:
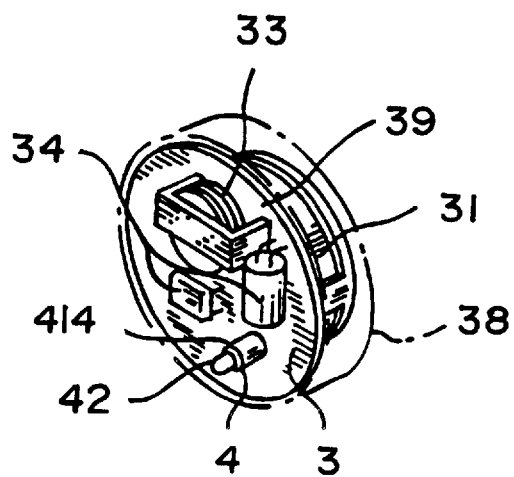
FIG. 7 is a perspective view of the housing also illustrated in FIG. 2 for housing the circuitry of FIG. 1.

The preferred embodiment of the invention involves a rotating object such as a wheel, wheel cover, or hubcap, which are schematically illustrated in FIG. 1. It is anticipated, based on the following description and the schematic illustration of a disc-shaped object in FIG. 1, together with the detailed drawings included in FIGS. 2–7, that those skilled in the art will easily be able to apply the principles of the invention to a variety of different rotating objects in a variety of applications, including wheels for pedal powered vehicles such as bicycles, wheels for motor vehicles, roller and skateboard wheels, and the wheels of toys.

A principal feature of the invention is to use a device referred herein as a "super-thin light means," defined as a light having a thickness of less than 2 mm. At present, the only lighting elements which are known to fit the super-thin requirements are electro-luminescent (EL) and photoluminescent (PL) light panels or strips (and lighting elements made up of both EL and PL particles or combinations of EL and PL segments, although it is possible that analogous types of lighting elements will become available in the future. As noted above, super-thin lighting elements are advantageous for the purposes of the invention not only because their use will not interfere with the rotation of the object to which they are attached, but also because super-thin lighting elements can in general be easily affixed to any type of hard or soft surface by stitching or gluing, and be silk-screened or printed with a variety of designs, patterns, or wording, with transparent, partially transparent, or opaque ink for a variety of decorative effects. Because a super-thin lighting element is flexible, it can follow the shape of the surface, and further can be cut and applied by a variety of techniques to resemble a variety of fabric-like patterns and configurations. In the case of a wheel, for example, the super-thin light means can be inset along the perimeter of a transparent inner part of the wheel, or on the outside of a non-transparent disc, and attached by means of glue, tape, Velcro™, welding and a variety of other known methods of attaching a thin material to another object.

Of course, the inclusion of a lighting element in a rotating object is useless if a power source is not included (although those skilled in the art will appreciate that PL, in contrast to EL, lighting elements do not require a power source). As a result, for the case where the lighting element is an EL strip or panel, the invention uses a circuit board with a self-contained battery, electric components, a transformer, a switch, and a housing. The principal purpose of the circuitry, which may be in the form of conventional or integrated circuitry is to convert the DC current supplied by the battery into a form suitable for triggering the light means, and to provide other special effects if desired, including steady state, flashing, control of a plurality of different light means with chasing, random, fade-in and fade-out, and other special effects. In addition, the circuitry includes a switch used to turn the system on and off whenever the light is needed, with all components being contained in the housing, which is preferably waterproof or environmentally sealed and may have a variety of shapes and is easily attached to the objects.

The preferred switch is a spring type motion switch, as will be explained in more detail below in connection with FIGS. 2, 3, and 4, which turns the light on based on motion. This is to be distinguished from prior motion sensors, such as those disclosed in U.S. Pat. Nos. 4,595,200 and 3,502,831, which are not used as a switch to turn on an illumination means in a rotating object. The preferred switch includes a spring forming a first terminal which contacts the wall of a metal cylinder forming the second terminal of the switch when the switch is set in motion by inertia upon rotation of the object.

As illustrated in FIG. 1, the rotating object of the preferred embodiment of the invention, which by way of example can be a hubcap, wheel cover, or wheel includes a main body 1 having attached thereto two types of elements 2 and 2' and, in the case where the lighting elements are EL strips or panels as opposed to PL strips or panels, a circuit board 3 located at the center of the object. Preferably, circuit board 3 is contained within a housing of the type shown in FIG. 2, although inclusion of the circuit board in a housing is not absolutely necessary to the function of the invention in its broadest form. As illustrated, lighting elements 2 are in the form of stars while lighting elements 2' are rectangular in shape and have lettering silk-screened thereon, although those skilled in the art will appreciate that the lighting elements may take numerous different forms.

Each of the lighting elements for the rotating object of this preferred embodiment of the invention includes a pair of terminals 28 connected to the circuit board 3 via wires 32 through tubes 24 which serve as structural supports of the disc. The lighting elements may be placed on the surface of the rotating object, or inset into the surface of the object, with wires passing into the interior of the disc through holes, and the strips being secured in the insets or to the surface of the wheel by an attachment means such as Velcro™ or by tape, welding, or glue schematically represented by layer 21 in FIG. 2. In the case of bicycle and other spoked wheels, the lighting elements may be placed around the rim which supports the tire, or affixed to discrete supports placed within the spokes as is the case with conventional reflectors.

While details of the circuitry on circuit board 3 are discussed in more detail below in connection with FIG. 5, it is noted that in this embodiment of the invention, the circuitry includes a motion sensitive switch 4, used in connection with the EL version of the various preferred embodiments of the invention. FIG. 2 shows that the switch is mounted on circuit board 3, which also has mounted thereon a transformer 33 and various other electrical components 34, and to which are connected the wires 32 leading from the terminals 28 of the individual lighting elements 2. Wires 32 enter the circuit board housing via openings 416 in an upper housing half 38, the lower housing half 39 being separable from the upper housing half by twisting to enable the user to access battery 31 mounted below the circuit board 3 to provide an exceptionally compact and efficient arrangement. Preferably, the lower housing half 38 is attached to the body 1 of the object in question by an attachment means 5 which can be in any convenient form. If the housing is to be removable, Velcro™ provides an especially convenient attachment means.

The switch 4 itself is made up of a cylindrical outer metal housing 41 mounted on a base 412 and which forms one pole of the switch and is connected to traces on the circuit board by terminals 46. The other pole of the switch is a flexible metal coil spring 43 connected to another trace on the circuit board by a terminal 412. The switch 43 as illustrated has more and wider coils at the free end 417 than at the terminal end, as a result of which the inertia of the free end of the switch causes it to flex whenever the switch is moved so as to contact housing 41 and thereby complete a circuit between terminals 46 and 412 which are respectively connected to the negative and positive terminals of the power supply.

Uniquely, in order to prevent wastage of the battery power when lighting effects are not desired, the spring switch 4, a cylindrical isolating member 48 is provided which can be placed between the metal cylinder 41 and the spring 43 so as to prevent the spring from engaging the housing and establishing a connection between the poles of the switch. Advantageously, cylinder or straw 48 is inserted through the upper housing of the circuit board assembly through an opening 414 and is attached to a rubber plug 42 which provides a handle for inserting and withdrawing the cylinder and also seals the opening against moisture when the object is not use. As a result, the invention provides an especially compact motion sensitive switch arrangement which consists of only a base, a coil spring, an outer metal cylinder, and a rubber plug with a straw or cylinder attached thereto for providing motion-sensitive control of the lighting element when desired, and for protecting the circuitry and preventing wastage of power when lighting is not desired.

Figure 5:
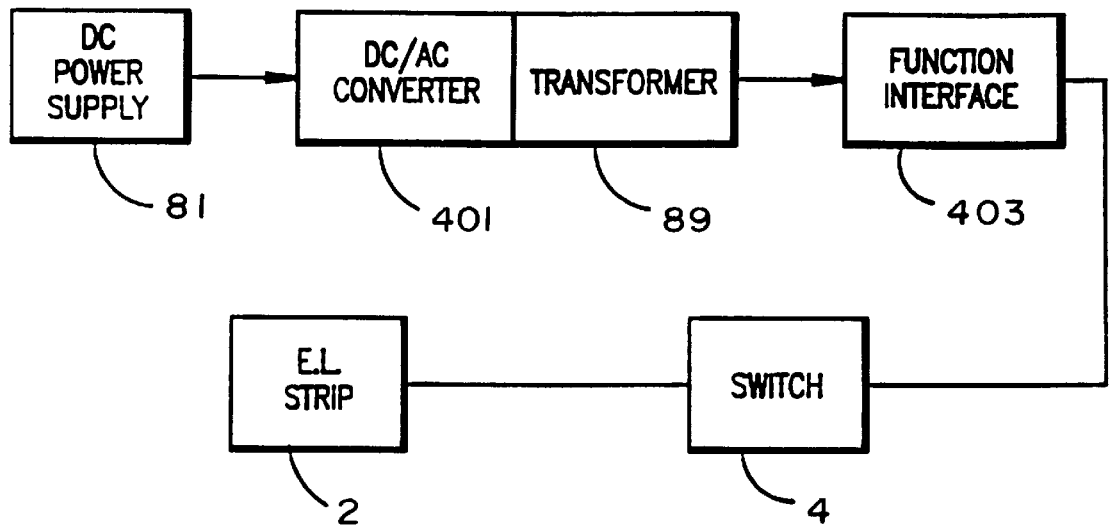
FIG. 5 is a functional block diagram of the illumination means and circuitry for use in the embodiments of FIG. 1.
Figure 6:
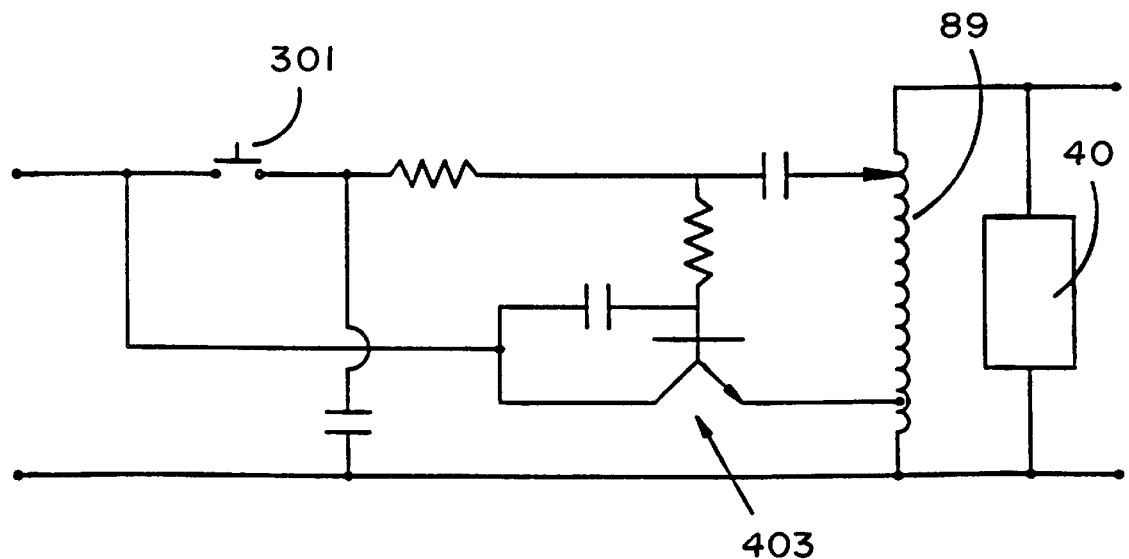
FIG. 6 is as schematic diagram showing details of the circuitry illustrated in FIG. 6.

Turning now to the circuitry shown in FIGS. 5 and 6, DC power supply 31 is electrically connected to the lighting element 2 via a circuit which includes a DC/AC converter 401 electrically connected with a transformer 402, transformer 402 being further electrically connected with a function interface 403 and, via parallel connected switch 4, to the lighting element 2. Those skilled in the art will appreciate that the battery in this embodiment of the invention can be a rechargeable battery which can be charged by a device having a higher voltage output than the battery's, and that the direct current supplied by DC power source 31 is thus converted into an alternating current of a desired frequency by DC/AC converter 401 and supplied to the transformer 402 for increasing the voltage of the alternating current, and then transmitted from the transformer 402 to the function interface 403. Function interface 403 provides a number of preset or switchable options for turning on the lighting element 2, e.g., steady, flash, sequential or random, and may take any desired form from a simple circuit as illustrated in FIG. 10 to a microprocessor, depending on the complexity of the special effects to be exhibited. Those skilled in the art will appreciate that the number of options is greatly increased if a multiple element strip such as the one disclosed in copending U.S. patent application Ser. No. 08/305,294 is utilized.

Having thus described several preferred embodiments of the invention and a number of variations and modifications of the preferred embodiments, it is anticipated that still further variations and modifications will undoubtedly occur to those skilled in the art upon reading the above description. For example, while the lighting element can be turned on and off by means of the specially designed motion sensitive switch 4, it may also be desired to include or substitute a photosensitive or manual, solid state or mechanical switch to turn the light on and off upon the occurrence of external events such as nightfall or simply at the whim of the user. It is therefore intended that the invention not be limited by the above description, but rather that it be interpreted, in accordance with the appended claims, to cover all such variations and modifications which fairly fall within the scope of the invention.

I claim:

1. A rotating object, comprising:

a disc-shaped main body arranged to rotate;

at least one flexible super-thin electro-luminescent lighting element arranged to luminesce in response to application of an electrical current;

means including a power source positioned within said disc-shaped main body and circuitry arranged to supply said electrical current from said power source to said electro-luminescent element at a voltage and frequency sufficient to cause said electro-luminescent element to luminesce;

a circuit board located at a center of the main body, said circuit board having mounted thereon at least a portion of said circuitry;

means for electrically connecting the power source to the circuitry on said circuit board;

means including wires for electrically connecting the circuitry on said circuit board to said lighting element; and means for attaching the lighting element directly to a surface of the main body at a position away from said circuit board.

2. A rotating object as claimed in claim 1, wherein the circuitry includes a motion sensitive switch.

3. A rotating object as claimed in claim 2, wherein the motion sensitive switch comprises a conductive cylinder and a conductive spring positioned inside the cylinder to contact the cylinder and complete a circuit when the rotating object is in motion.

4. A rotating object as claimed in claim 3, wherein the spring is a coil spring.

5. A rotating object as claimed in claim 3, wherein the motion sensitive switch is mounted in a housing having an opening, and further comprising an insulating cylinder arranged to be inserted through the conductive cylinder and to fit between the spring and the conductive cylinder in order to prevent contact between the spring and the conductive cylinder.

6. A rotating object as claimed in claim 5, wherein the insulating cylinder is attached to a rubber plug which seals said opening when the insulating cylinder is inserted through the opening to isolate the spring and the conductive cylinder.

7. A rotating object as claimed in claim 1, wherein the rotating object is an object selected from the group consisting of a wheel, a wheel cover, and a hubcap.

8. A rotating object as claimed in claim 7, wherein the circuit board is positioned centrally inside the rotating object.

9. A rotating object as claimed in claim 1, wherein the power supply is connected to the lighting element via an electronic switch.

10. A rotating object as claimed in claim 1, wherein the attachment means comprises a means selected from the group consisting of glue, tape, welding.

11. A rotating object as claimed in claim 1, wherein the lighting element has a surface at least partially silk-screened.

12. A rotating object as claimed in claim 11, wherein the silk-screened surface includes varying transparencies of ink.

13. A rotating object as claimed in claim 1, wherein the power supply and circuitry are positioned in a separate housing attached to a surface of the rotating object.

14. A rotating object as claimed in claim 1, wherein the power supply is connected to the lighting element via a mechanical switch.

* * * * *